United States Patent
Otani

(10) Patent No.: US 9,614,701 B2
(45) Date of Patent: Apr. 4, 2017

(54) COMMUNICATION DEVICE AND METHOD FOR REPRODUCING DATA

(71) Applicant: FUJITSU LIMITED, Kawasaki-shi, Kanagawa (JP)

(72) Inventor: Masato Otani, Sendai (JP)

(73) Assignee: FUJITSU LIMITED, Kawasaki (JP)

( * ) Notice: Subject to any disclaimer, the term of this patent is extended or adjusted under 35 U.S.C. 154(b) by 36 days.

(21) Appl. No.: 14/715,654

(22) Filed: May 19, 2015

(65) Prior Publication Data
US 2016/0028564 A1    Jan. 28, 2016

(30) Foreign Application Priority Data
Jul. 24, 2014  (JP) .................................. 2014-151251

(51) Int. Cl.
*H04L 25/06* (2006.01)
*H04B 10/079* (2013.01)

(52) U.S. Cl.
CPC .................................. *H04L 25/069* (2013.01)

(58) Field of Classification Search
CPC ............................ H01L 41/042; H04L 25/069
See application file for complete search history.

(56) References Cited

U.S. PATENT DOCUMENTS

| 6,337,650 B1 * | 1/2002 | Mitsutani | H03L 7/091 341/155 |
| 9,070,856 B1 * | 6/2015 | Rose | H01L 41/042 |
| 2013/0300301 A1 * | 11/2013 | Miyahara | H05B 33/0806 315/171 |
| 2015/0156842 A1 * | 6/2015 | Miyahara | H05B 33/0815 315/210 |
| 2016/0028564 A1 * | 1/2016 | Otani | H04L 25/069 398/25 |

FOREIGN PATENT DOCUMENTS

| JP | 06-232931 | 8/1994 |
| JP | 6-268700 | 9/1994 |
| JP | 7-56645 | 3/1995 |
| JP | 7-312571 | 11/1995 |
| JP | 2000-349745 | 12/2000 |
| JP | 2002-281096 | 9/2002 |

* cited by examiner

*Primary Examiner* — Oommen Jacob
(74) *Attorney, Agent, or Firm* — Fujitsu Patent Center

(57) ABSTRACT

A communication device includes a processor that executes a process including: detecting a plurality of zero-cross samples each having a different plus-minus sign from a sign of an adjacent sample from among a plurality of samples obtained by oversampling a received signal; changing positions of the detected zero-cross samples to positions inside a window referring to a position of a reference zero-cross sample selected from the detected zero-cross samples; calculating an average value of relative distances between the reference zero-cross sample and the zero-cross samples, after the positions of the zero-cross samples are changed at the changing; and determining a zero-cross point serving as a reference point for estimating a peak position of the received signal, based on the calculated average value of the relative distances and the reference zero-cross sample.

6 Claims, 11 Drawing Sheets

COMMUNICATION DEVICE AND METHOD FOR REPRODUCING DATA

CROSS-REFERENCE TO RELATED APPLICATION

This application is based upon and claims the benefit of priority of the prior Japanese Patent Application No. 2014-151251, filed on Jul. 24, 2014, the entire contents of which are incorporated herein by reference.

FIELD

The embodiment discussed herein is directed to a communication device and a method for reproducing data.

BACKGROUND

A communication device for making communications such as optical communication and wireless communication generally reproduces data by demodulating a received signal. Specifically, such a communication device oversamples the received signal with a predetermined sampling frequency and, based on the obtained sample, estimates a peak position on the amplitude of the received signal. The communication device reproduces binary data indicating 0 or 1 according to the sign of the sample positioned in a cycle of a symbol length with the estimated peak position as a starting point.

In estimating a peak position on the amplitude of the received signal, the communication device may detect a zero-cross point having amplitude of zero and presume that the peak position is positioned a half symbol length ahead of the zero-cross point. In other words, a symbol has a waveform starting from a zero-cross point and reaching the next zero-cross point after passing through a plus peak or a minus peak. By first detecting a sample corresponding to a zero-cross point, it is thus presumable that another sample positioned a half symbol length ahead of the sample corresponds to the peak.

For example, when a received signal is oversampled with a sampling frequency in which a symbol corresponds to 16 samples, provided that the first sample denotes a zero-cross point, the ninth sample having eight samples behind can be regarded as a peak. In the following description, a sample number is assigned for each sample in a cyclic manner based on a symbol length, and a sample with a sample number x (x is integer) is referred to as xOS (oversample). For example, provided that a symbol corresponds to 16 samples, sample numbers 0 to 15 are allocated to respective samples in a cyclic manner. In this case, a sample with a sample number 0 is referred to as 0OS. Furthermore, a sample number equals to the remainder obtained by dividing the serial number of the sample by the number of samples corresponding to a symbol. For example, provided that a symbol corresponds to 16 samples, the third and the nineteenth samples from the head both fall on 3OS because these samples have a remainder of 3 when divided by 16.

When the communication device detects a zero-cross point, the device sets a detection object point serving as a reference point in detecting a zero-cross point. The detection object point has a comparatively large absolute value on the amplitude, and a point positioned a symbol length ahead of the detection object point has a reverse sign to that of the detection object point and has a comparatively large absolute value on the amplitude. With such a detection object point, it is possible to determine that a zero-cross point is present within the term of a symbol length from the detection object point. Because the detection object point has a comparatively large absolute value on the amplitude, the detection object point is considered to be positioned close to the peak position. A zero-cross point usually is present a half symbol length ahead of the detection object point. Examples in related art are described in Japanese Laid-open Patent Publication No. 2000-349745 and Japanese Laid-open Patent Publication No. 06-232931.

Environmental factors including a noise may decrease the accuracy in detecting a zero-cross point. If the accuracy in detecting a zero-cross point is decreased, a peak position detected based on the zero-cross point is accordingly inaccurately detected, which may cause errors on the reproduced data. In view of improving the accuracy in detecting a zero-cross point, it may be effective to detect a plurality of zero-cross points and define the average value of sample numbers assigned to the respective zero-cross points as a sample number of a final zero-cross point. In other words, considering effects of a noise and others, averaging processing is useful in accurately detecting a zero-cross point.

However, as described above, because a sample number is calculated with the remainder calculation, a plurality of actually detected zero-cross points are sometimes totally different from the final zero-cross point obtained by the averaging processing. For example, although 15OS in a symbol term and 0OS in the next symbol term are samples adjacent to each other, the average value between these samples is calculated as 7.5 (=(15+0)/2). The sample number obtained from the averaging processing thus indicates a sample positioned far from the samples having the original sample numbers. A plurality of actually detected zero-cross points thus do not problematically match a final zero-cross point obtained from the averaging processing.

Such a problem will now be described with some examples. FIGS. 11A and 11B are drawings that each illustrate examples of actually detected zero-cross points. In FIGS. 11A and 11B, based on the assumption that a symbol length corresponds to 16 samples, the abscissa represents a time indicated by sample numbers of 0 to 15 assigned in a cyclic manner whereas the ordinate represents the amplitude of a received signal.

FIG. 11A is a drawing that illustrates a zero-cross point 20 detected at a part of the received signal. In FIG. 11A, for example, 7OS is set as a detection object point 10, and the zero-cross point 20 is detected at a point positioned 9OS ahead of the detection object point 10. The remainder is 0 when 16 (=7+9) is divided by 16, and the zero-cross point 20 is thus defined as 0OS. FIG. 11B is a drawing that illustrates a zero-cross point 40 detected at another part of the received signal identical to that of FIG. 11A. In FIG. 11B, for example, 7OS is set as a detection object point 30, and the zero-cross point 40 is detected at a point positioned 8OS ahead of the detection object point 30. The remainder is 15 when 15 (=7+8) is divided by 16, and the zero-cross point 40 is thus defined as 15OS.

In this way, when two zero-cross points 20 and 40 are detected at different parts of an identical received signal, the average value of the respective sample numbers of the zero-cross points 20 and 40 is calculated to be 7.5 (=(0+15)/2). The final zero-cross point is thus defined as 7OS or 8OS. However, as clearly illustrated in FIGS. 11A and 11B, 7OS and 8OS are both positioned close to the peak position of the received signal and are quite far from the actually detected zero-cross points 20 and 40. These results indicate that an inaccurate final zero-cross point has been worked out by performing the average processing on the sample numbers obtained from the remainder calculation. Specifically, because of the remainder calculation used to detect the zero-cross points 20 and 40, the zero-cross points 20 and 40, which are close to each other on the symbol cycle basis, are calculated to be 0OS and 15OS, respectively, which are positioned far from each other.

In view of the above-described problem, it may be conceived of performing averaging processing on sample numbers of actually detected zero-cross points without performing the remainder calculation. However, even in the case of not performing the remainder calculation, a plurality of actually detected zero-cross points may mismatch the final zero-cross point obtained by performing the average processing. FIGS. 12A and 12B are drawings that each illustrate examples of actually detected zero-cross points. In FIGS. 12A and 12B, as illustrated in FIGS. 11A and 11B, the abscissa represents a time indicated by sample numbers of 0 to 15 assigned in a cyclic manner whereas the ordinate represents the amplitude of a received signal.

FIG. 12A is a drawing that illustrates a zero-cross point 60 detected at a part of the received signal. In FIG. 12A, for example, 15OS is set as a detection object point 50, and the zero-cross point 60 is detected at a point positioned 9OS ahead of the detection object point 50. The zero-cross point 60 is thus defined as 24 (=15+9) OS if the remainder calculation is not performed thereon. FIG. 12B is a drawing that illustrates a zero-cross point 80 detected at another part of the received signal identical to that of FIG. 12A. In FIG. 12B, for example, 0OS is set as a detection object point 70, and the zero-cross point 80 is detected at a point positioned 8OS ahead of the detection object point 70. The zero-cross point 80 is thus defined as 8 (=0+8) OS if the remainder calculation is not performed thereon.

In this way, when two zero-cross points 60 and 80 are detected at different parts of an identical received signal, the average value of the respective sample numbers of the zero-cross points 60 and 80 is calculated to be 16 (=(24+8)/2). The final zero-cross point is thus defined as 16OS, that is, 0OS. However, as clearly illustrated in each of FIGS. 12A and 12B, 0OS is close to the peak position of the received signal and is quite far from the actually detected zero-cross points 60 and 80. These results indicate that an inaccurate final zero-cross point has been worked out by performing the average processing on the sample numbers obtained without performing the remainder calculation. The detection object points 50 and 70, which are close to each other on the symbol cycle basis, are calculated, respectively, to be 15OS and 0OS, which are positioned far from each other. These results are caused because neither of the sample numbers of the zero-cross points 60 nor 80, which are based on the detection object points 50 and 70, respectively, has undergone the remainder calculation.

As described above, when a final zero-cross point less affected by a noise and the like is determined by detecting a plurality of zero-cross points and performing the average processing thereon, there is a problem in which an inaccurate zero-cross point may be determined.

SUMMARY

According to an aspect of an embodiment, a communication device includes a processor that executes a process including: detecting a plurality of zero-cross samples each having a different plus-minus sign from a sign of an adjacent sample from among a plurality of samples obtained by oversampling a received signal; changing positions of the detected zero-cross samples to positions inside a window referring to a position of a reference zero-cross sample selected from the detected zero-cross samples; calculating an average value of relative distances between the reference zero-cross sample and the zero-cross samples, after the positions of the zero-cross samples are changed at the changing; and determining a zero-cross point serving as a reference point for estimating a peak position of the received signal, based on the calculated average value of the relative distances and the reference zero-cross sample.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. It should be noted that the embodiment is not intended to limit the scope of the present invention. In the embodiment, a receiving device that receives an optical signal will be described as an example of a communication device; however, the present invention is applicable for various kinds of communication devices including a wireless communication device and the like.

Figure 1:
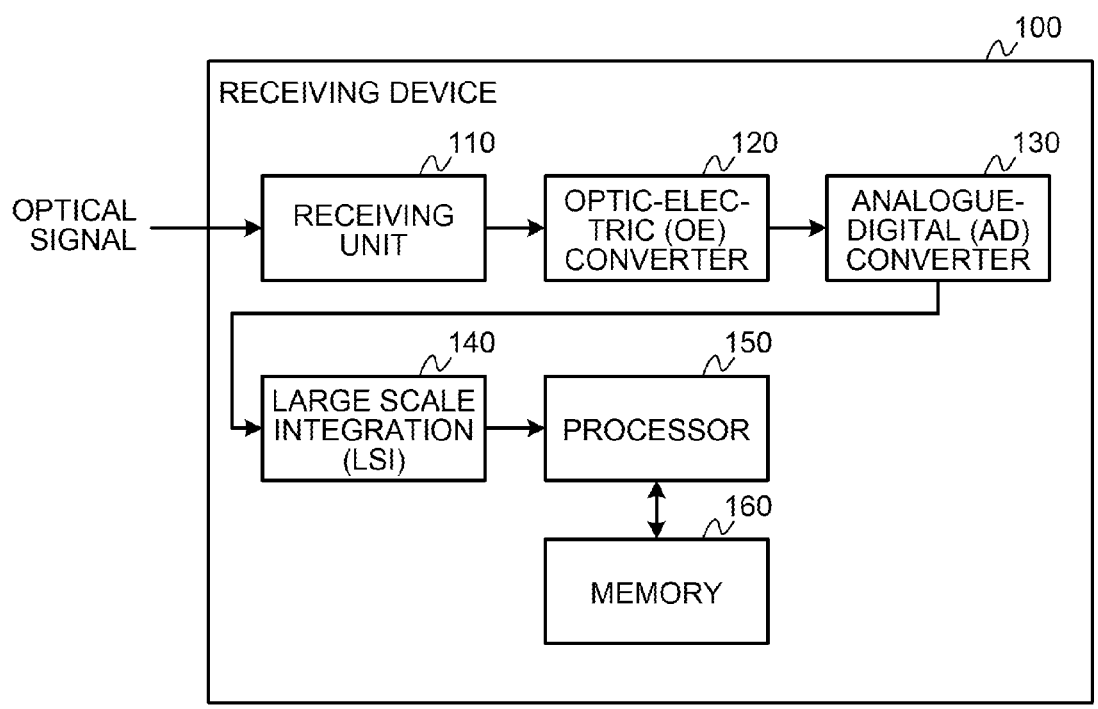
FIG. 1 is a block diagram that illustrates the configuration of a receiving device according to an embodiment.

FIG. 1 is a block diagram that illustrates the configuration of a receiving device 100 according to the embodiment. The receiving device 100 illustrated in FIG. 1 includes a receiving unit 110, an optic-electric (OE) converter 120, an analogue digital (AD) converter 130, a large scale integration (LSI) 140, a processor 150, and a memory 160.

The receiving unit 110 receives an optical signal and performs predetermined receiving processing on the received optical signal.

The OE converter 120 includes, for example, a photo diode. The OE converter 120 performs a photoelectric conversion on the received optical signal and obtains a received signal that has been converted into an electric signal.

The AD converter 130 performs an analog-digital conversion on the received signal and obtains a received signal that has been converted into a digital signal.

The LSI 140 has a circuit for demodulating the received signal and reproduces data superimposed on the received signal. More specifically, the LSI 140 oversamples the received signal with a specific sampling frequency and, from the obtained sample, determines a zero-cross point that has amplitude of zero. The LSI 140 regards a point positioned a half symbol length ahead of the zero-cross point as a peak position and reproduces binary data indicating 0 or 1 according to the sign of a sample positioned in every symbol cycle from the peak position. The LSI 140 detects a plurality of zero-cross points, performs averaging processing for calculating the average value of relative distances from the initially detected zero-cross point to the other zero-cross points, and determines a final zero-cross point. The configuration and operation of the LSI 140 will be described later in detail.

The processor 150 includes a central processing unit (CPU), a digital signal processor (DSP), or the like, and integrally controls each part of the receiving device 100. The processor 150 acquires data obtained with the LSI 140 demodulating the received signal and performs various kinds of processing based on the data.

The memory 160 includes a random access memory (RAM) and the like and transiently stores therein a program and data used in processing performed by the processor 150.

Figure 2:
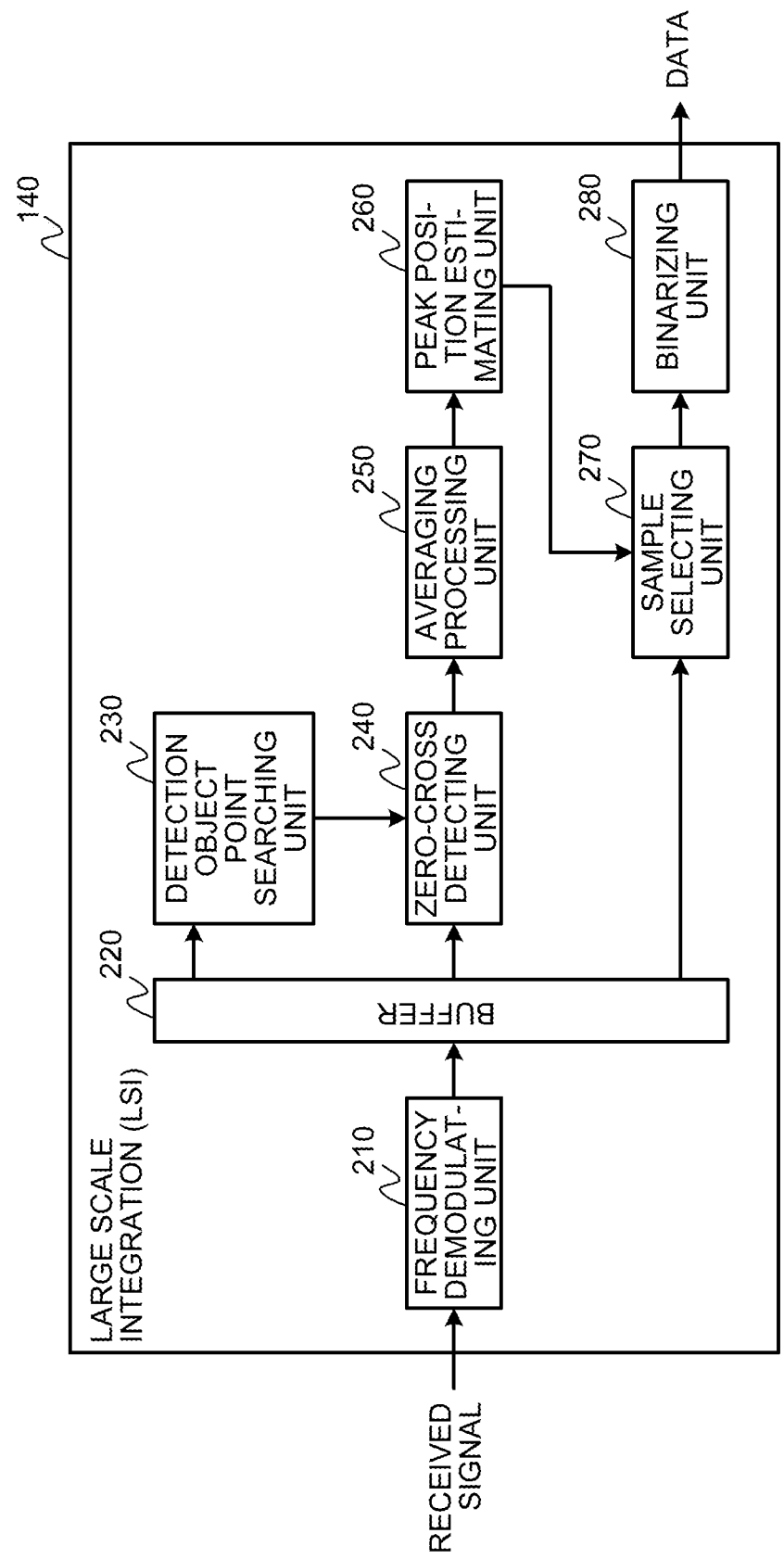
FIG. 2 is a block diagram that illustrates the configuration of large scale integration (LSI) according to the embodiment.

FIG. 2 is a block diagram that illustrates the configuration of the LSI 140 according to the embodiment. The LSI 140 illustrated in FIG. 2 includes a frequency demodulating unit 210, a buffer 220, a detection object point searching unit 230, a zero-cross detecting unit 240, an averaging processing unit 250, a peak position estimating unit 260, a sample selecting unit 270, and a binarizing unit 280. The LSI 140 has circuits corresponding to the respective processing units.

The frequency demodulating unit 210 performs frequency demodulation on the received signal and extracts a waveform of the received data from the carrier wave. The frequency demodulating unit 210 oversamples the waveform of the received data with a specific sampling frequency and sequentially stores the obtained sample in the buffer 220. The frequency demodulating unit 210 oversamples the waveform of the received data with a sampling frequency where, for example, a symbol corresponds to 16 samples.

The buffer 220 transiently stores a sample output from the frequency demodulating unit 210. The buffer 220 has capacity storable therein the number of samples corresponding to at least two symbols and stores those samples in time series.

The detection object point searching unit 230 searches the buffer 220 storing therein samples for a detection object point, based on which a sample (hereinafter referred to as a "zero-cross sample") closest to a point with amplitude of zero is detected. Specifically, using a predetermined plus or minus threshold, the detection object point searching unit 230 specifies a sample having amplitude of equal to or greater than the predetermined plus threshold or a sample having amplitude of smaller than the predetermined minus threshold out of samples corresponding to a symbol and stored in the buffer 220. The detection object point searching unit 230 thereafter determines whether such a condition is satisfied that a sample positioned a symbol length ahead of the specified sample has amplitude equal to or greater than the predetermined plus threshold or smaller than the predetermined minus threshold and further has a reverse sign to the sign of the amplitude of the specified sample. For example, when the detection object point searching unit 230 specifies a sample the amplitude of which is equal to or greater than the predetermined plus threshold, the detection object point searching unit 230 determines whether the amplitude of a sample positioned a symbol length ahead of the specified sample is smaller than the predetermined minus threshold.

If the sample positioned a symbol length ahead satisfies the condition, the detection object point searching unit 230 defines the earlier-specified sample as a detection object point. In this manner, the detection object point searching unit 230 defines a detection object point, thereby confirming that a zero-cross sample is present within the term corresponding to a symbol length from the detection object point. The detection object point searching unit 230 may use a value of 60% to 70% as large as the peak amplitude of a received signal as a predetermined plus or minus threshold, for example.

The zero-cross detecting unit 240 detects a zero-cross sample out of samples stored in the buffer 220 based on the detection object point defined by the detection object point searching unit 230. Specifically, the zero-cross detecting unit 240 acquires, from the buffer 220, a sample positioned a half symbol length ahead of the detection object point together with samples positioned right behind and ahead of the sample and obtains the signs of the acquired three samples. If the signs of these three samples are identical, the zero-cross detecting unit 240 detects no zero-cross samples and stands by until a new detection object point is defined by the detection object point searching unit 230. On the contrary, if there is a difference among the signs of the three samples, the zero-cross detecting unit 240 compares the amplitude between two samples adjacent to each other and having different signs from each other and detects a sample the amplitude of which is closer to zero as a zero-cross sample.

The zero-cross detecting unit 240 detects no zero-cross samples if the three samples, which include a sample positioned a half symbol length ahead of the detection object point, have the same sign. However, because it is certain that a zero-cross sample is present within the term of a symbol length from the detection object point, if the processing speed is high enough, the zero-cross detecting unit 240 may acquire four or more samples from the buffer 220 and detect a zero-cross sample. In other words, if the zero-cross detecting unit 240 is capable of detecting a zero-cross sample within an allowed time, the zero-cross detecting unit 240 may detect a zero-cross sample on each detection object point.

The averaging processing unit 250 performs averaging processing on sample numbers of a plurality of zero-cross samples detected based on respective detection object points. The averaging processing unit 250 determines a sample number obtained from the averaging processing to be a final zero-cross point. Specifically, the averaging processing unit 250 makes the first zero-cross sample out of a plurality of zero-cross samples as a reference point and calculates relative distances from the reference point to the respective zero-cross samples. The averaging processing unit 250 cumulatively adds the relative distances from the reference point to the respective zero-cross samples, calculates the average value of the relative distances, and based on the obtained average value, determines the sample number of a final zero-cross point. The configuration and operation of the averaging processing unit 250 will be described later in detail.

The peak position estimating unit 260 estimates a peak position on the waveform of the received data based on the zero-cross point determined by the averaging processing unit 250. Specifically, the peak position estimating unit 260 regards a point positioned a half symbol length ahead of the zero-cross point as a peak position. For example, in oversampling the waveform of received data with a sampling frequency where a symbol corresponds to 16 samples, the peak position estimating unit 260 regards a point positioned eight samples ahead of the zero-cross point as a peak position and notifies of the sample number of the peak position to the sample selecting unit 270.

When the sample number of the peak position is notified, the sample selecting unit 270 acquires a sample corresponding to the notified sample number from the buffer 220 and outputs the sample to the binarizing unit 280. After the sample selecting unit 270 outputs the sample to the binarizing unit 280, the sample selecting unit 270 acquires, from the buffer 220, another sample positioned in every symbol cycle from the output sample and similarly outputs the acquired sample to the binarizing unit 280.

The binarizing unit 280 performs binarization based on the sign of a sample output from the sample selecting unit 270 and reproduces data. Specifically, if the sign of the amplitude of a sample indicates plus, the binarizing unit 280 reproduces "1" from the sample. If the sign of the sample indicates minus, the binarizing unit 280 reproduces "0" from the sample. As another example, the binarizing unit 280 may compare the amplitude value of a sample with a predetermined threshold and reproduce "1" from the sample if the amplitude value of the sample is equal to or greater than the threshold. The binarizing unit 280 may reproduce "0" if the amplitude value of the sample is smaller than the threshold. It is variable depending on cases how the amplitude value of a sample and the predetermined threshold are related with reproduced "1" and "0".

Figure 3:
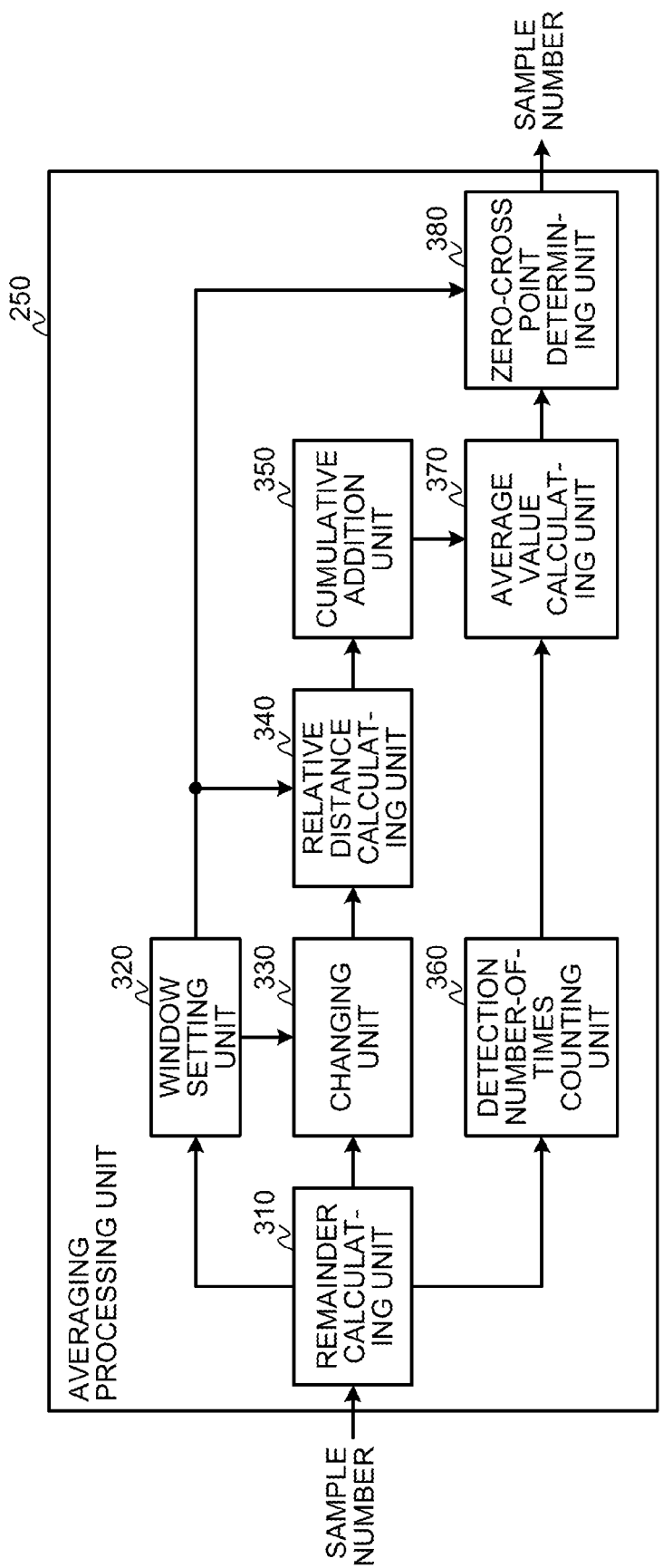
FIG. 3 is a block diagram that illustrates the configuration of an averaging processing unit according to the embodiment.

The configuration of the above-described averaging processing unit 250 is now described in detail. FIG. 3 is a block diagram that illustrates the configuration of the averaging processing unit 250 according to the embodiment. The averaging processing unit 250 illustrated in FIG. 3 includes a remainder calculating unit 310, a window setting unit 320, a changing unit 330, a relative distance calculating unit 340, a cumulative addition unit 350, a detection number-of-times counting unit 360, an average value calculating unit 370, and a zero-cross point determining unit 380.

The remainder calculating unit 310 performs a remainder calculation on the sample number of the zero-cross sample detected by the zero-cross detecting unit 240. The remainder calculating unit 310 calculates a remainder by dividing the sample number of the zero-cross sample by the number of samples corresponding to a symbol. For example, provided that a symbol corresponds to 16 samples, the remainder calculating unit 310 calculates a remainder by dividing the sample number of the zero-cross sample by 16. The calculated remainder, which is smaller than the number of samples corresponding to a symbol, can be defined as a normalized sample number of the zero-cross sample. The normalized sample number will be hereinafter simply referred to as a sample number.

When the remainder calculating unit 310 has performed the remainder calculation on a first zero-cross sample, the window setting unit 320 sets a window having the first zero-cross sample as a reference point. Specifically, the window setting unit 320 sets a window having the same width in the plus direction and in the minus direction from the sample number serving as a reference point and having a total width smaller than the number of samples corresponding to a symbol by 1. For example, provided that a symbol corresponds to 16 samples, the window setting unit 320 sets a window having a total width of 15OS, which consists of a width of 7OS in the plus direction and a width of 8OS in the minus direction from the first zero-cross sample. In another case, the window setting unit 320 may set a window having a width of 8OS in the plus direction and a width of 7OS in the minus direction from the first zero-cross sample.

The changing unit 330 determines whether the second and subsequent zero-cross samples fall within the range of the window set by the window setting unit 320. In the case of not falling, the changing unit 330 changes the sample number of the zero-cross sample. For example, the changing unit 330 subtracts the number of samples corresponding to a symbol from the sample number of a zero-cross sample that is large and thus exceeds the width in the plus direction of the window from the first zero-cross sample. The changing unit 330 adds the number of samples corresponding to a symbol to the sample number of a zero-cross sample that is small and thus exceeds the width in the minus direction of the window from the first zero-cross sample. The changing unit 330 does not change the sample number of a zero-cross sample that falls within the range of the window.

Such a case is given as an example in which a first zero-cross sample is 1OS and a window having a width of 7OS in the plus direction and a width of 8OS in the minus direction is set with 1OS as the center. In the second and subsequent zero-cross samples, if the sample number is larger than 8 (=1+7), the changing unit 330 subtracts 16 from the sample number of the zero-cross sample. In other words, if any of the second and subsequent zero-cross samples falls within 9OS to 15OS, the changing unit 330 changes the zero-cross sample to −7OS to −1OS, respectively. In the second and subsequent zero-cross samples, if the sample number is equal to or smaller than 8, the changing unit 330 does not change the sample number of the zero-cross sample. In other words, if any of the second and subsequent zero-cross samples falls within 0OS to 8OS, the changing unit 330 keeps the zero-cross sample unchanged.

Similarly, such a case is given as another example in which a first zero-cross sample is 15OS and a window having a width of 7OS in the plus direction and a width of 8OS in the minus direction is set with 15OS as the center. In the second and subsequent zero-cross samples, if the sample number is smaller than 7 (=15−8), the changing unit 330 adds 16 to the sample number of the zero-cross sample. In other words, if any of the second and subsequent zero-cross samples falls within 0OS to 6OS, the changing unit 330 changes the zero-cross sample to 16OS to 22OS, respectively. In the second and subsequent zero-cross samples, if the sample number is equal to or larger than 7, the changing unit 330 does not change the sample number of the zero-cross sample. In other words, if any of the second and subsequent zero-cross samples falls within 7OS to 15OS, the changing unit 330 keeps the zero-cross sample unchanged.

As described above, the changing unit 330 makes each of the second and subsequent zero-cross samples fall within the range of the window having the first zero-cross sample as a reference point by changing the sample number of the zero-cross sample.

The relative distance calculating unit 340 calculates the relative distance from the first zero-cross sample to the second and subsequent zero-cross samples. Specifically, on each of the second and subsequent zero-cross samples, the relative distance calculating unit 340 subtracts the sample number of the first zero-cross sample from the sample number having been changed by the changing unit 330 to calculate the relative distance with the first zero-cross sample as a reference point. Because the changing unit 330 has changed the sample number of the second and subsequent zero-cross samples, the relative distance calculating unit 340 calculates the relative distance in the range of the window having the first zero-cross sample as the center thereof. A zero-cross sample closer to the first zero-cross sample thus has a smaller absolute value in the relative distance calculated by the relative distance calculating unit 340.

The cumulative addition unit 350 cumulatively adds the relative distances calculated by the relative distance calculating unit 340. In other words, the cumulative addition unit 350 cumulatively adds positional differences, which are generated with the first zero-cross sample as a reference point, of the second and subsequent zero-cross samples.

The detection number-of-times counting unit 360 counts the number of times that the zero-cross detecting unit 240 has detected a zero-cross sample by counting up the number of times that the remainder calculating unit 310 has performed the remainder calculation. In other words, because the remainder calculating unit 310 performs the remainder calculation on every time of detection of a zero-cross sample, the detection number-of-times counting unit 360 counts up the number of times of detection of a zero-cross sample by counting the number of the remainder calculations.

When the number of times of detection counted by the detection number-of-times counting unit 360 has reached a predetermined number of times, the average value calculating unit 370 acquires a result of the cumulative addition performed by the cumulative addition unit 350 and calculates the average value. In other words, when a predetermined number of zero-cross samples has been detected, the average value calculating unit 370 calculates the average value of relative distances from the first zero-cross sample serving as a reference point to respective zero-cross samples. The average value calculating unit 370 divides the result of the cumulative addition performed by the cumulative addition unit 350 by the number of times that a zero-cross sample has been detected.

The zero-cross point determining unit 380 determines a final zero-cross point, based on the average value calculated by the average value calculating unit 370. Specifically, the zero-cross point determining unit 380 adds the average value to the sample number of the first zero-cross sample serving as the center of the window and calculates the sample number of a zero-cross point. If the result of adding the average value to the sample number of the first zero-cross sample is not an integer, the zero-cross point determining unit 380 may assign an integer closest to the result to the sample number of the zero-cross point.

A method for reproducing data used by the LSI 140 configured as described above will now be described with some examples with reference to the flowchart illustrated in FIG. 4.

When samples obtained by oversampling received data are stored in the buffer 220 in time series, the detection object point searching unit 230 selects the oldest sample (Step S101). The detection object point searching unit 230 determines whether the selected sample satisfies the condition to serve as a detection object point (Step S102). Specifically, the detection object point searching unit 230 determines whether the first condition is satisfied that the amplitude of the sample is equal to or greater than a predetermined plus threshold or smaller than a predetermined minus threshold. If the first condition is satisfied, the detection object point searching unit 230 determines whether the second condition is satisfied that another sample positioned a symbol length ahead of the sample has amplitude equal to or greater than the predetermined plus threshold or smaller than the predetermined minus threshold and has a reverse sign to that of the sample satisfying the first condition.

Figure 5:
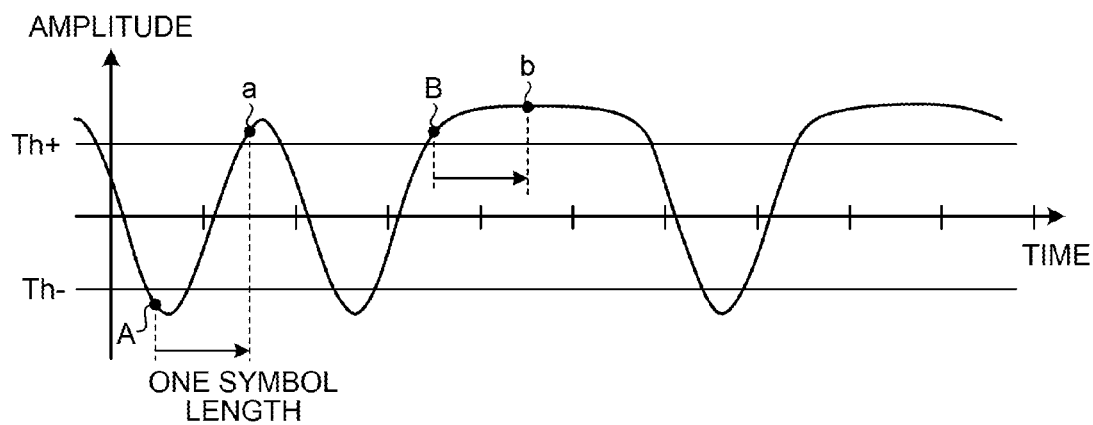
FIG. 5 is a drawing for explaining a search of a detection object point.

If the first condition and the second condition are both satisfied, the detection object point searching unit 230 sets the sample satisfying the first condition as a detection object point. The detection object point indicates that a zero-cross sample is present within the term of a symbol length ahead of the point. In other words, as illustrated in FIG. 5, a sample A satisfies the first condition that the amplitude is smaller than a predetermined minus threshold Th− and also satisfies the second condition that a sample a positioned a symbol length ahead of the sample A has amplitude equal to or greater than a predetermined plus threshold Th+ and has a reverse sign to that of the sample A. A zero-cross sample thus is present within the term corresponding to a symbol length from the sample A to the sample a. In this case, the sample A is set as a detection object point.

As illustrated in FIG. 5, a sample B satisfies the first condition that the amplitude is equal to or greater than the predetermined plus threshold Th+ but does not satisfy the second condition because a sample b positioned a symbol length ahead of the sample B has the same sign as that of the sample B. It is thus not determined that a zero-cross sample is present within the term corresponding to a symbol length from the sample B to the sample b. In this case, the sample B is not set as a detection object point.

If the detection object point searching unit 230 does not set the selected sample as a detection object point (No at Step S102), the detection object point searching unit 230 selects the next sample (Step S107). Together with this process, the detection object point searching unit 230 determines whether all of the samples corresponding to a symbol have been selected (Step S108). In other words, provided that a symbol corresponds to 16 samples, the detection object point searching unit 230 determines whether the processing has been performed on all of the 16 samples. If the processing has been completed on the 16 samples (Yes at Step S108), the processing is performed on the next 16 samples. If the processing has not yet been performed on all of the samples corresponding to a symbol (No at Step S108), the detection object point searching unit 230 repeats determination on each of the samples on which the processing has not yet been completed about whether the sample is defined as a detection object point (Step S102).

If the sample selected by the detection object point searching unit 230 is set as a detection object point (Yes at Step S102), the zero-cross detecting unit 240 detects a zero-cross sample based on the detection object point (Step S103). Specifically, the zero-cross detecting unit 240 acquires, from the buffer 220, a sample positioned a half symbol length ahead of the detection object point together with samples positioned right behind and ahead of the sample and determines whether a zero-cross sample is included in the acquired three samples.

Figure 6:
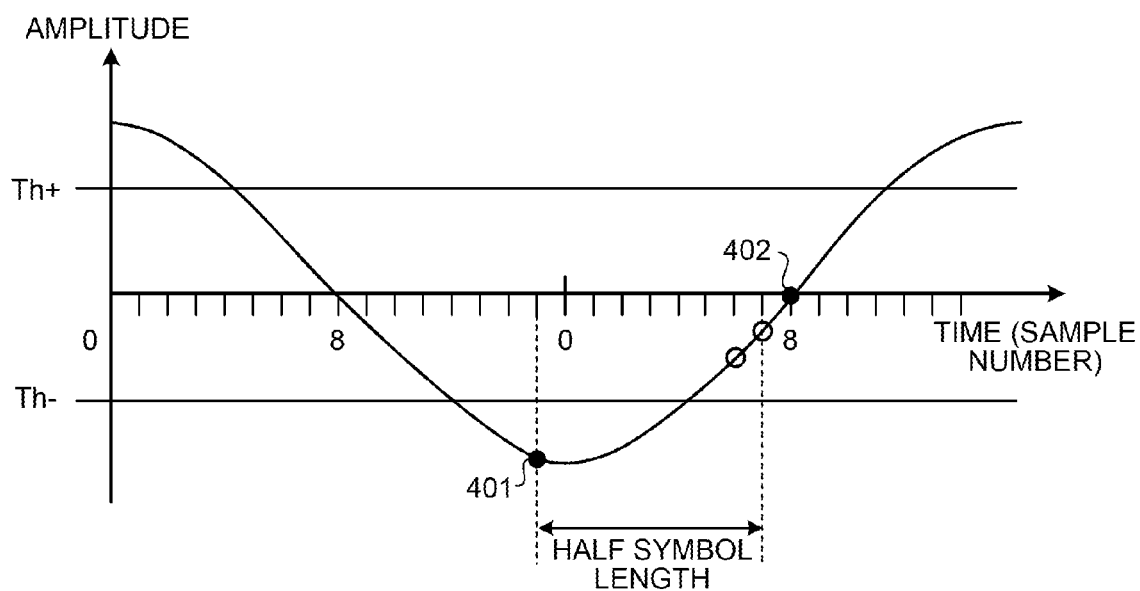
FIG. 6 is a drawing for explaining zero-cross detection.

More specifically, if the acquired three samples have the same sign, the zero-cross detecting unit 240 determines that no zero-cross samples are included. If there is a difference between the signs of the three samples, the zero-cross detecting unit 240 determines that a zero-cross sample is included. As illustrated in FIG. 6, the zero-cross detecting unit 240 determines whether a zero-cross sample is included based on the signs of 6OS to 8OS including 7OS positioned a half symbol ahead of a detection object point 401 (15OS), for example. In this case, the signs of 6OS and 7OS indicate minus whereas the sign of 8OS indicates plus, which means that the amplitude becomes zero between 7OS and 8OS adjacent to each other and having different signs from each other. The zero-cross detecting unit 240 thereafter determines 8OS, the amplitude of which is closest to zero, to be a zero-cross sample 402.

If the zero-cross detecting unit 240 determines that no zero-cross samples are included (No at Step S103), in a similar manner with the above-described case where no detection object points are set, the next sample is selected in units of samples corresponding to a symbol (Steps S107 and S108).

If the zero-cross detecting unit 240 determines that a zero-cross sample is included (Yes at Step S103), the sample number of the zero-cross sample is output to the averaging processing unit 250. The averaging processing unit 250 performs averaging processing on the sample number of the zero-cross sample (Step S104). The averaging processing calculates the average value of relative distances from the first zero-cross sample serving as a reference point to respective zero-cross samples. A final zero-cross point reflecting a plurality of zero-cross samples is determined based on the average value and the first zero-cross sample, and the sample number of the zero-cross point is notified to the peak position estimating unit 260. The averaging processing performed by the averaging processing unit 250 will be described later in detail.

When the sample number of the final zero-cross point is notified to the peak position estimating unit 260, the peak position estimating unit 260 estimates a peak position on the waveform of received data (Step S105). More specifically, the peak position estimating unit 260 estimates a position at a half symbol length ahead of the zero-cross point as a peak position. The peak position estimating unit 260 calculates the sample number of the peak position by adding the number of samples corresponding to a half symbol to the sample number of the zero-cross point and obtaining the remainder by dividing the result of the addition by the number of samples corresponding to a symbol.

The sample number of the peak position is notified to the sample selecting unit 270, and the sample selecting unit 270 acquires a sample of the notified sample number from the buffer 220. Because a sample number is assigned to each sample in a cyclic manner based on a symbol length, the sample selecting unit 270 acquires a sample positioned at the peak position in each symbol. The binarizing unit 280 determines the sign of the amplitude of the sample positioned at the peak position and binarizes the sample into data indicating 0 or 1 (Step S106). In this case, "1" is reproduced if the sample has amplitude in a plus value whereas "0" is reproduced if the sample has amplitude in a minus value, for example.

As described above, in the embodiment, a zero-cross point reflecting a plurality of zero-cross samples is determined by calculating the average value of relative distances from the first zero-cross sample serving as a reference point to respective zero-cross samples. Data of the peak position, which is estimated based on the determined zero-cross point, is thereafter reproduced. This process can reproduce data of an accurate peak position based on an accurate zero-cross point, thereby reducing data errors.

Figure 7:
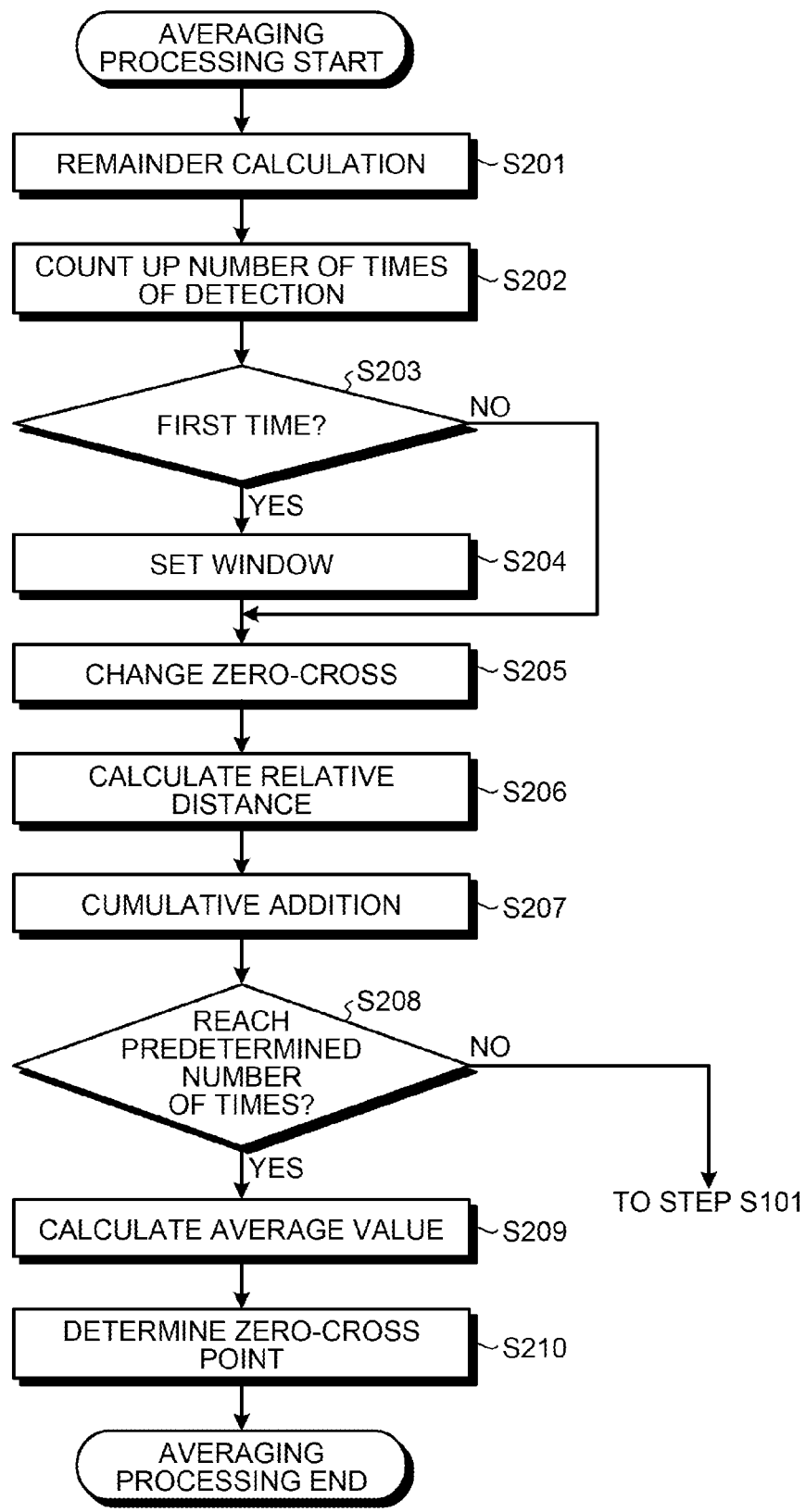
FIG. 7 is a flowchart that illustrates averaging processing according to the embodiment.

The averaging processing at Step S104 illustrated in FIG. 4 will now be described in detail with reference to the flowchart of FIG. 7.

The averaging processing starts in response to an input of a sample number of a zero-cross sample to the averaging processing unit 250. The sample number of a zero-cross sample output from the zero-cross detecting unit 240 is input to the remainder calculating unit 310. The remainder calculating unit 310 performs the remainder calculation on the sample number of the zero-cross sample (Step S201). In other words, the remainder is obtained by dividing the sample number of the zero-cross sample by the number of samples corresponding to a symbol. The obtained remainder is defined as a normalized sample number of this zero-cross sample. In this manner, numbers from zero to a number where 1 is subtracted from the number of samples corresponding to a symbol are used as a sample number of a zero-cross sample.

A sample number is normalized with the following reason. A zero-cross sample is detected based on a detection object point serving as a reference point and is defined as a sample positioned a half symbol length ahead of the detection object point or in the vicinity thereof. The sample number of a zero-cross sample is calculated by adding the number of samples corresponding to a half symbol to the sample number of the detection object point. For example, if the detection object point is 15OS and a symbol corresponds to 16 samples, the zero-cross sample is detected as 23 (=15+16/2) OS. In this way, depending on the sample number of a detection object point, the sample number of a zero-cross sample can be equal to or larger than the number of samples corresponding to a symbol. The remainder calculating unit 310 therefore normalizes the sample number. In this case, because a remainder of 7 is obtained by dividing 23 by 16, the sample number of the zero-cross sample is normalized to be 7OS.

The remainder calculating unit 310 performs such a remainder calculation every time the remainder calculating unit 310 receives an input of the sample number of a zero-cross sample. When the remainder calculating unit 310 performs the remainder calculation, the detection number-of-times counting unit 360 counts up the number of times that a zero-cross sample has been detected (Step S202). In other words, the detection number-of-times counting unit 360 counts the number of detected zero-cross samples. The window setting unit 320 thereafter determines whether the detection is first-time detection (Step S203). If the detection is first-time detection (Yes at Step S203), the window setting unit 320 sets a window with the first-detected zero-cross sample as the center thereof (Step S204).

Figure 8:
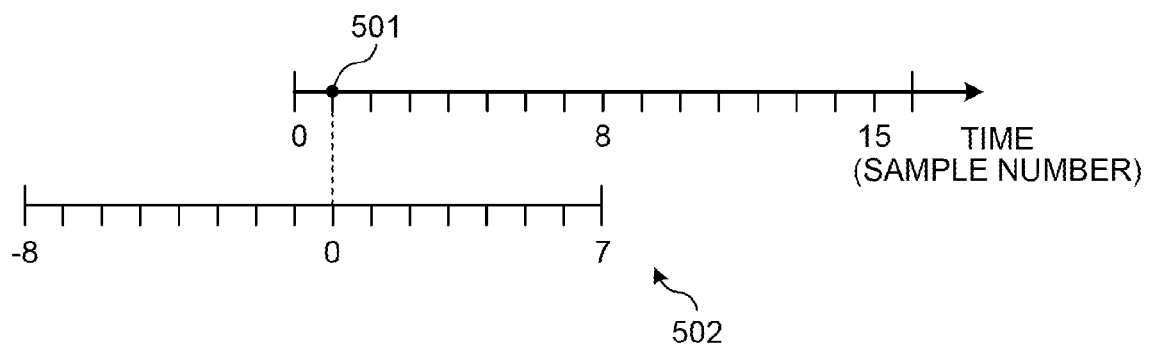
FIG. 8 is a drawing that illustrates an example of a window.

Specifically, as illustrated in FIG. 8, the window setting unit 320 sets a window 502, the total width of which is smaller than the number of samples corresponding to a symbol by 1, with a first zero-cross sample 501 as the center of the window. FIG. 8 illustrates an example of the case where a symbol corresponds to 16 samples. The window 502 thus has a total width of 15OS and has the same width in the plus direction and in the minus direction. In this case, the total width is a width of 15OS, which consists of a width of 7OS in the plus direction and a width of 8OS in the minus direction.

As described above, by setting a window with the first zero-cross sample 501 as the center thereof, it is possible to accurately calculate relative distances from the first zero-cross sample 501 serving as a reference point to respective zero-cross samples that fall within the range of the window. Furthermore, considering that all the samples of 0OS to 15OS corresponding to a symbol can be defined as a zero-cross sample, the window 502 has a total width of 15OS. However, if the waveform of received data is in a good condition, the second and subsequent zero-cross samples are usually detected near the first zero-cross sample. If the maximum difference generated between the first zero-cross sample and each of the second and subsequent zero-cross samples is known, the width of the window 502 may be narrowed based on the maximum difference. With the same reason, the window 502 does not necessarily have the same width in the plus direction and in the minus direction.

This window setting process is not performed in the second or subsequent detection of a zero-cross sample (No at Step S203). The window setting is performed on the first zero-cross sample and not performed on the second or subsequent zero-cross samples. Accordingly, when the remainder calculating unit 310 performs the remainder calculation, a window having the first zero-cross sample as a reference point is always set.

The changing unit 330 thereafter changes the sample number of a zero-cross sample using the set window (Step S205). The changing unit 330 determines whether the zero-cross sample falls within the range of the window. If the zero-cross sample falls within the range of the window, the changing unit 330 does not change the sample number of the zero-cross sample. For example, because the first zero-cross sample serving as a reference point of the window always falls within the range of the window, the changing unit 330 does not change the sample number of the first zero-cross sample.

With respect to zero-cross samples not falling within the range of the window, the number of samples corresponding to a symbol is added or subtracted to/from the sample number. Specifically, the number of samples corresponding to a symbol is subtracted from the sample number of a zero-cross sample positioned outside the width in the plus direction of the window from the first zero-cross sample. Similarly, the number of samples corresponding to a symbol is added to the sample number of a zero-cross sample positioned outside the width in the minus direction of the window from the first zero-cross sample. With this process, all zero-cross samples are changed to fall within the range of the window, which makes it possible to simply compare the sample number of each zero-cross sample with the sample number of the first zero-cross sample. A zero-cross sample closer to the first zero-cross sample has a sample number closer to the sample number of the first zero-cross sample.

When the changing unit 330 completes changing the sample number, the relative distance calculating unit 340 subtracts the sample number of the first zero-cross sample from the changed sample number and calculates the relative distance with the first zero-cross sample as a reference point (Step S206). The calculated relative distance indicates a plus value for a zero-cross sample positioned in the plus side from the first zero-cross sample whereas indicates a minus value for a zero-cross sample positioned in the minus side from the first zero-cross sample.

The cumulative addition unit 350 cumulatively adds the calculated relative distances (Step S207). Cumulative addition of relative distances means accumulation of positional differences generated between the first zero-cross sample and other zero-cross samples.

In parallel with the calculation and cumulative addition of relative distances, the average value calculating unit 370 monitors whether the number of times that a zero-cross sample has been detected reaches a predetermined number of times (Step S208). In other words, the average value calculating unit 370 determines whether the detection number-of-times counting unit 360 has counted a predetermined number of times. The predetermined number of times indicates the number of times of detection of a zero-cross sample, which is used for determining the final zero-cross point. The number of times such as three times is determined in advance.

Figure 4:
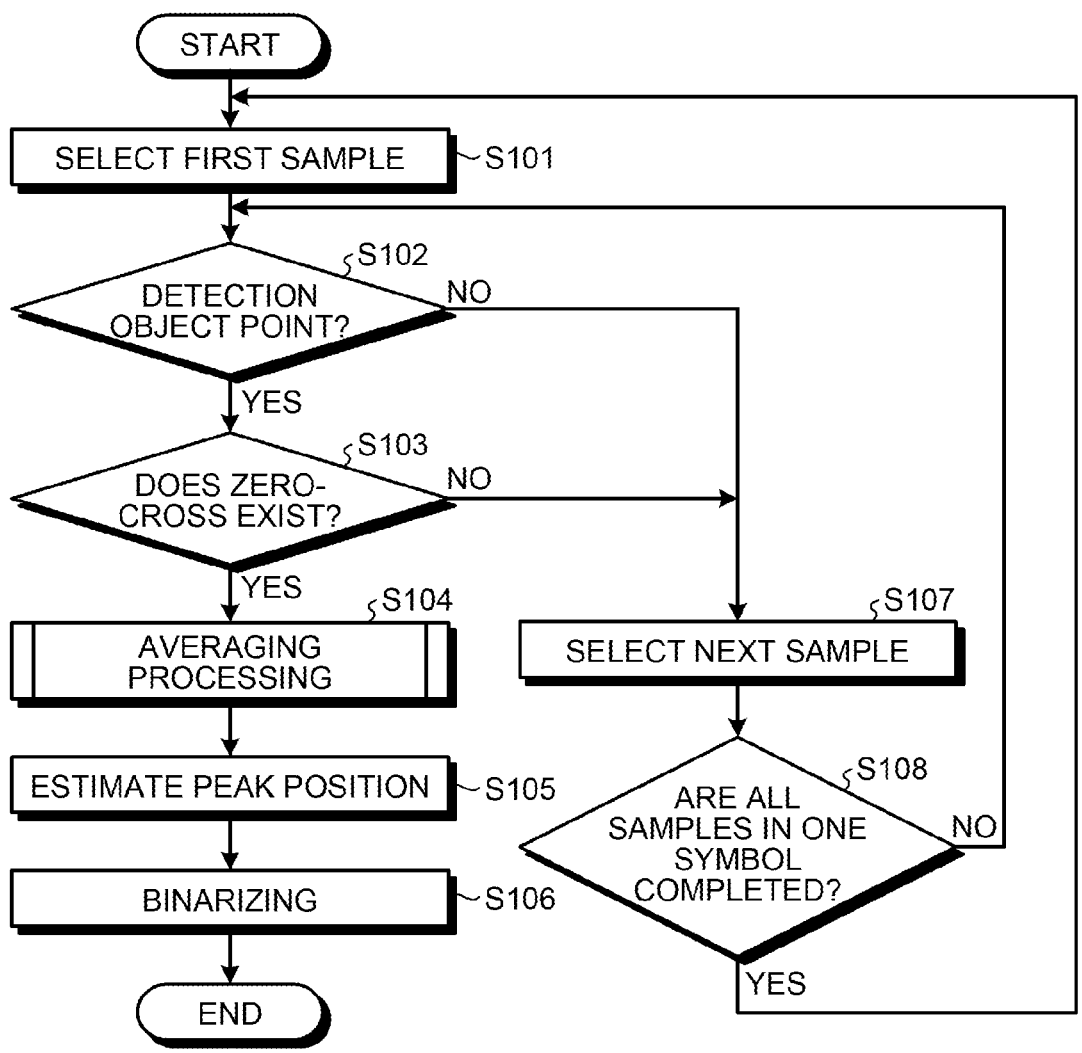
FIG. 4 is a flowchart that illustrates a method for reproducing data according to the embodiment.

If the number of times of detection of a zero-cross sample has not yet reached the predetermined number of times (No at Step S208), the processing is restarted from Step S101 illustrated in FIG. 4 to detect another zero-cross sample and repeat calculation and cumulative addition of the relative distance. If the number of times of detection of a zero-cross sample reaches the predetermined number of times (Yes at Step S208), the average value calculating unit 370 acquires current results of cumulative addition from the cumulative addition unit 350 and calculates an average value (Step S209). In other words, the average value calculating unit 370 divides the results of the cumulative addition by the number of counts counted by the detection number-of-times counting unit 360 to calculate the average value of relative distances to the respective zero-cross samples. As described above, the cumulative addition of relative distances indicates accumulation of positional differences generated between the first zero-cross sample and other zero-cross samples. The average value thus corresponds to the average value of positional differences generated between the first zero-cross sample and the respective zero-cross samples.

The zero-cross point determining unit 380 determines a final zero-cross point using the first zero-cross sample serving as the center of a window and the calculated average value (Step S210). The zero-cross point determining unit 380 adds the average value to the sample number of the first zero-cross sample and determines a sample having a sample number closest to the adding result to be a zero-cross point.

With the averaging processing according to the embodiment, a window is set with the first zero-cross sample as the center thereof, and the sample numbers of the second and subsequent zero-cross samples are each changed to numbers falling within the range of the window. After that, relative distances from the first zero-cross sample serving as a reference point to other zero-cross samples are averaged based on the changed sample numbers. In this way, regardless of the sample number initially assigned to the detected zero-cross sample, the positional difference from the first zero-cross sample is correctly averaged, and an accurate zero-cross point can be therefore determined.

An example of determining a zero-cross point will be described with reference to FIGS. 9A to 9C and FIGS. 10A and 10B. In the following description, a symbol corresponds to 16 samples, and a zero-cross point is determined using three zero-cross samples.

Figure 9A:
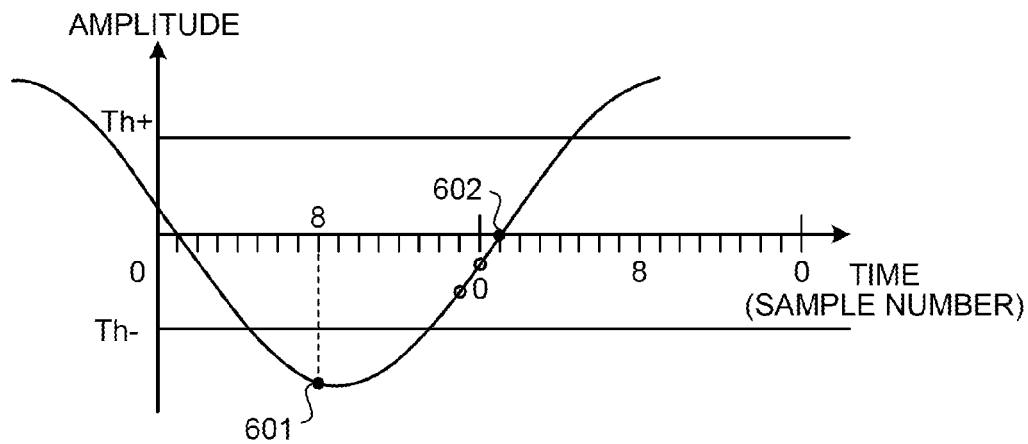
FIGS. 9A to 9C are drawings that each illustrate examples of zero-cross detection.
Figure 9B:
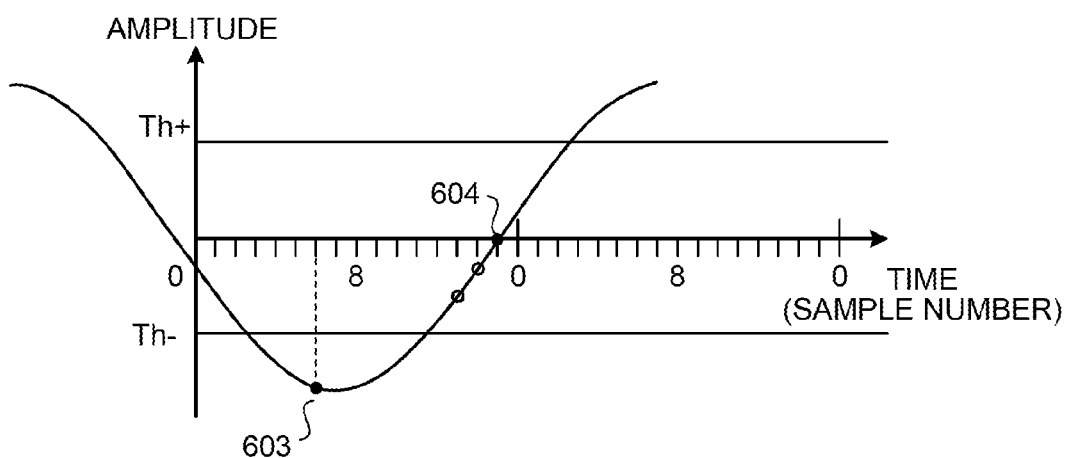
Figure 9C:
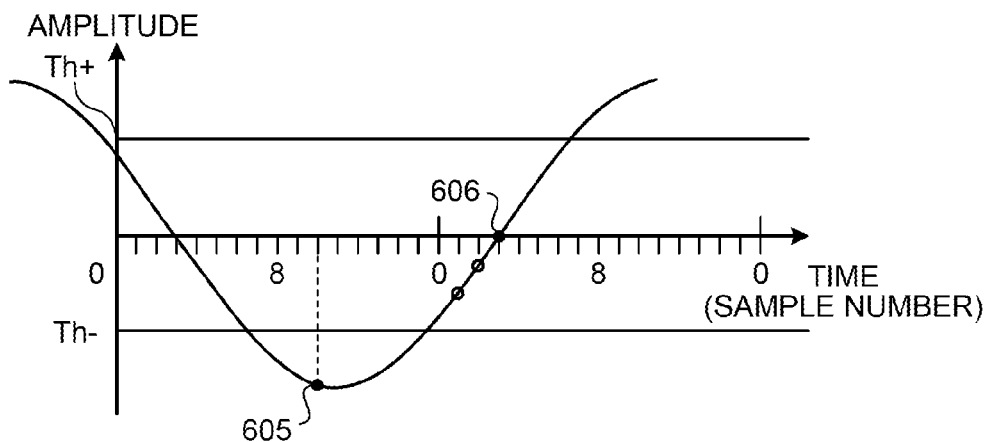

FIGS. 9A to 9C are drawings that illustrate detected three zero-cross samples. FIG. 9A indicates that a detection object point 601 is set at 8OS and 17 (=8+9) OS, which is positioned 9OS ahead of the detection object point 601, is detected as a zero-cross sample 602. FIG. 9B indicates that a detection object point 603 is set at 6OS and 15 (=6+9) OS, which is positioned 9OS ahead of the detection object point 603, is detected as a zero-cross sample 604. FIG. 9C indicates that a detection object point 605 is set at 10OS and 19 (=10+9) OS, which is positioned 9OS ahead of the detection object point 605, is detected as a zero-cross sample 606. In FIGS. 9A to 9C, the abscissa indicates a time in a cycle of 16OS corresponding to a symbol. As described above, because a zero-cross sample is detected based on the sample number of a detection object point, the sample number of the zero-cross sample can be a number equal to or larger than 16. Furthermore, the zero-cross sample 602 illustrated in FIG. 9A denotes the first zero-cross sample, and the zero-cross sample 604 illustrated in FIG. 9B denotes the second zero-cross sample, and the zero-cross sample 606 illustrated in FIG. 9C denotes the third zero-cross sample.

The sample numbers of the zero-cross samples detected in this manner are each normalized by the remainder calculating unit 310 performing the remainder calculation on the sample numbers. In this case, the remainder obtained by dividing the sample number by 16 is defined as the sample number of a zero-cross sample. The zero-cross sample 602 thus results in 1 (=17 mod 16, mod means the remainder calculation) OS, and the zero-cross sample 604 results in 15 (=15 mod 16) OS, and the zero-cross sample 606 results in 3 (=19 mod 16) OS.

Because the zero-cross sample 602 denotes the first zero-cross sample, the window setting unit 320 sets a window based on the zero-cross sample 602. This window, for example, has a width of 7OS in the plus direction and a width of 8OS in the minus direction. The changing unit 330 determines whether the zero-cross samples 604 and 606 each fall within the range of the window and changes the sample number of a zero-cross sample which does not fall within the range of the window.

Figure 10A:
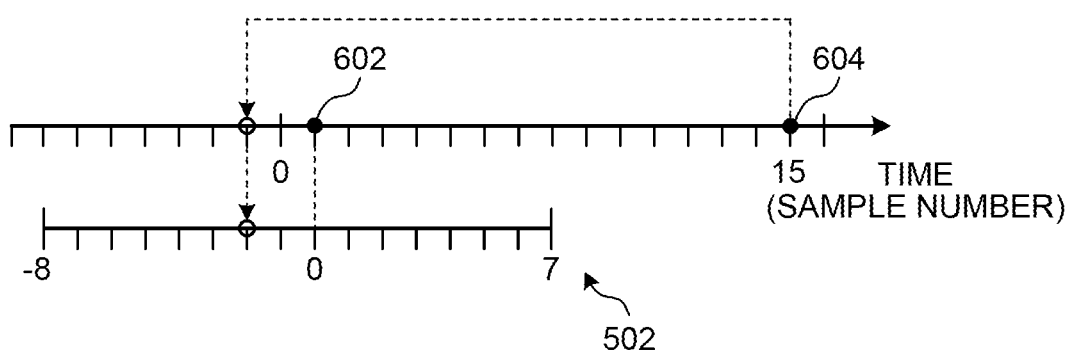
FIGS. 10A and 10B are drawings that each illustrate examples of zero-cross conversion.
Figure 10B:
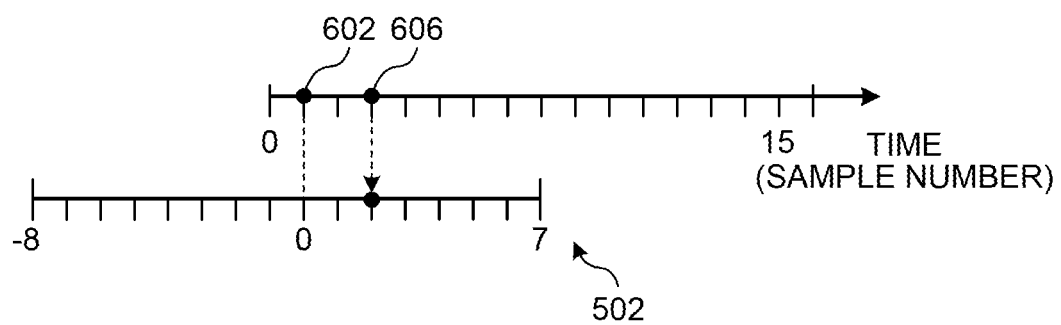
Figure 11A:
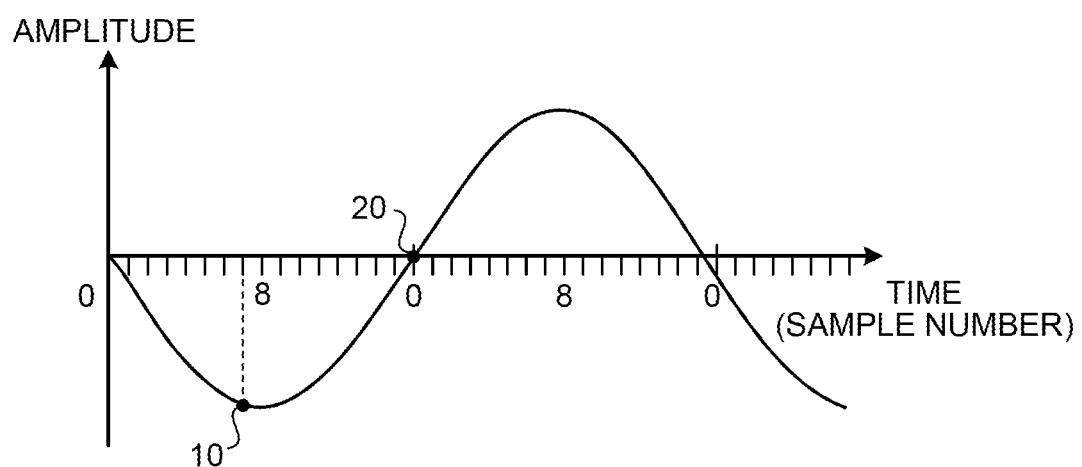
FIGS. 11A and 11B are drawings that each illustrate examples of zero-cross points.
Figure 11B:
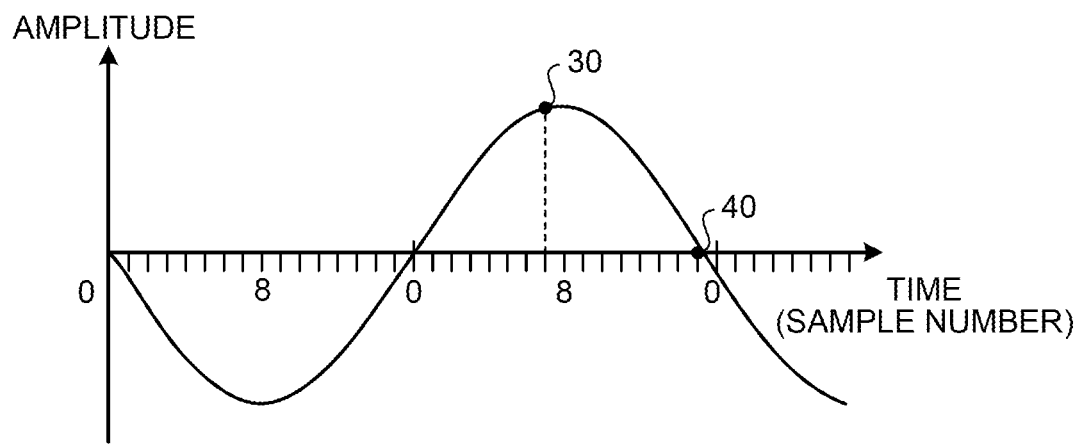
Figure 12A:
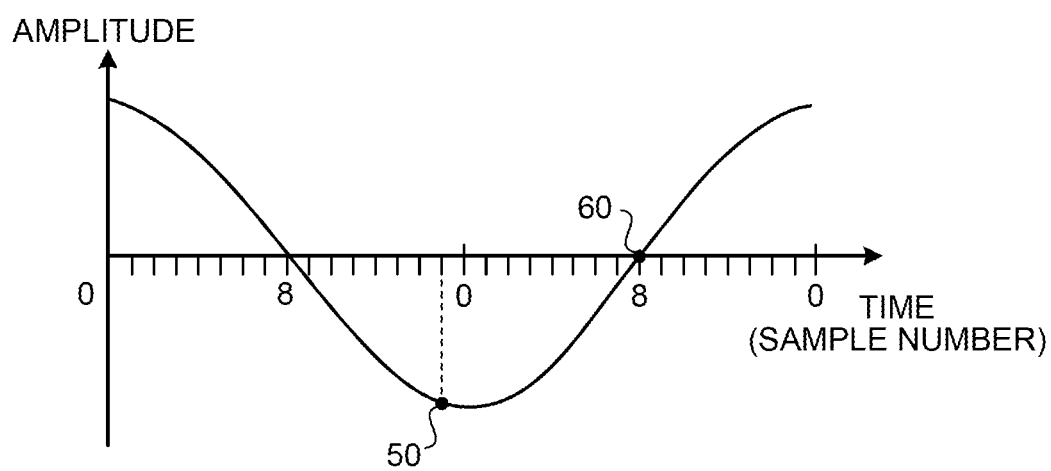
FIGS. 12A and 12B are drawings that each illustrate examples of zero-cross points.
Figure 12B:
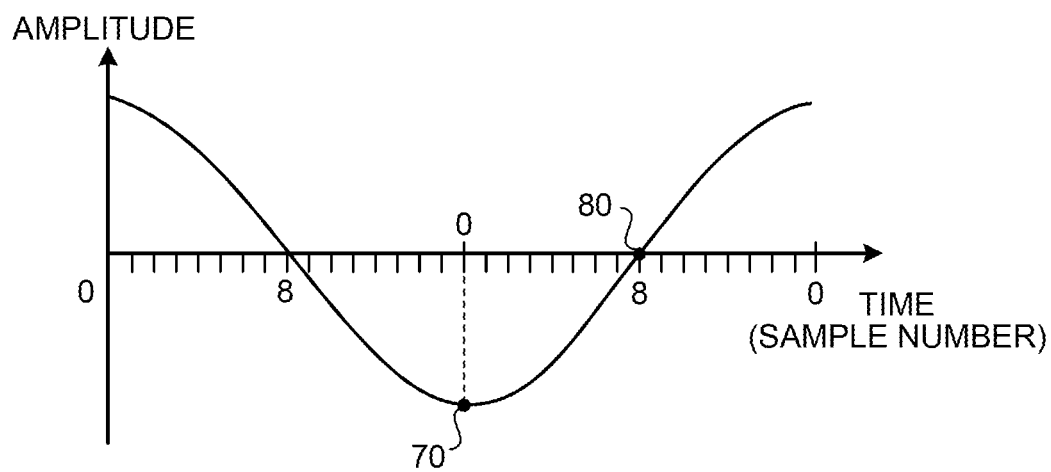

FIGS. 10A and 10B are drawings that illustrate a change of the sample number of a zero-cross sample. FIG. 10A illustrates a window 502 having the zero-cross sample 602 as the center thereof and the zero-cross sample 604. As illustrated in FIG. 10A, because the zero-cross sample 604 denotes 15OS, the zero-cross sample 604 is positioned outside the width in the plus direction of the window 502, which has 1OS as the center thereof. In this case, the changing unit 330 subtracts the number of samples corresponding to a symbol from the sample number of the zero-cross sample 604 and accordingly changes the zero-cross sample 604 to −1 (=15−16) OS. In this way, because the zero-cross sample 604 is positioned outside the width in the plus direction of the window 502 from the zero-cross sample 602, a change to move the position toward the minus direction in units of a symbol length is performed on the zero-cross sample 604, whereby the zero-cross sample 604 is moved to a position inside the window 502. Similarly, a change to move the position toward the plus direction in units of a symbol length is performed on a zero-cross sample positioned outside the width in the minus direction of the window from a zero-cross sample serving as a reference point, whereby the zero-cross sample is moved to a position inside the window.

FIG. 10B illustrates the window 502 having the zero-cross sample 602 as the center thereof and the zero-cross sample 606. As illustrated in FIG. 10B, the zero-cross sample 606 denotes 3OS and is thus positioned inside the width in the plus direction of the window 502 having 1OS as the center thereof. In this case, the changing unit 330 does not change the sample number of the zero-cross sample 606, and the zero-cross sample 606 remains as 3OS.

As described above, after the change on the zero-cross samples 604 and 606, the zero-cross samples 602, 604, 606 accordingly denote 1OS, −1OS, and 3OS, respectively. These sample numbers correctly indicate the relative positions of the respective zero-cross samples, and the relative distance between the zero-cross samples can be calculated with a simple subtraction. The relative distance calculating unit 340 calculates the relative distances between the zero-cross sample 602 and the zero-cross sample 604 and between the zero-cross sample 602 and the zero-cross sample 606. The relative distance between the zero-cross sample 602 and the zero-cross sample 604 is calculated as −2 (=−1−1) whereas the relative distance between the zero-cross sample 602 and the zero-cross sample 606 is calculated as 2 (=3−1).

The cumulative addition unit 350 cumulatively adds these relative distances. At the time these three zero-cross samples 602, 604, and 606 have been detected, the result of the cumulative addition performed by the cumulative addition unit 350 is indicated as 0 (=−2+2). Because the number of times of detection counted by the detection number-of-times counting unit 360 has reached 3 times, which is a predetermined number of times, at this timing, the average value calculating unit 370 accordingly calculates the average value by dividing the result of the cumulative addition performed by the cumulative addition unit 350 by the number of times of detection. The average value calculating unit 370 gives 0 (=0/3) as the average value of the relative distances. The zero-cross point determining unit 380 adds 0, which is the average value of the relative distances, to 1, which is the sample number of the zero-cross sample 602. The sample number of a zero-cross point is hence determined to be 1, which means that the final zero-cross point is determined to be 1OS. This result is considered to be valid, because the zero-cross point is positioned close to all the zero-cross samples 602, 604, and 606.

According to the embodiment, a plurality of zero-cross samples are detected, and a window is set with one of those zero-cross samples as a reference point, and the sample numbers of other zero-cross samples are changed to numbers falling within the range of the window. After the calculation of the average value of relative distances from the zero-cross sample serving as a reference point to the respective changed zero-cross samples, a final zero-cross point is determined based on the zero-cross sample serving as a reference point and the average value of the relative distances. This process exerts advantageous effects of calculating the sample number of a zero-cross point with the relative positions of respective zero-cross samples correctly reflected thereon and accordingly determining an accurate zero-cross point.

In the embodiment, a window is set based on a first zero-cross sample. However, if the buffer 220 has large capacity, is capable of transiently storing a large number of samples, and has enough time for processing, the second and subsequent samples may be used as a reference point in setting a window. In other words, a window may be set with one of zero-cross samples as a reference point, and other zero-cross samples may be moved to fall within the range of the window.

The above-described data reproduction processing in the embodiment may be written as a program executable by a computer. Such a program may be executed, for example, with the processor 150 illustrated in FIG. 1 using the memory 160. Furthermore, the program may be installed to a computer in such a manner that the program is stored in a computer-readable recording medium. Examples of such a computer-readable recording medium include a portable memory medium such as a compact disc read only memory (CD-ROM), a digital versatile disc (DVD), and a universal serial bus (USB) memory and a semiconductor memory such as a flash memory.

According to an aspect of an embodiment of the present invention, a communication device and a method for reproducing data exert advantageous effects of determining an accurate zero-cross point.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication device comprising:
   a memory; and
   a processor that is coupled to the memory and executes a process including:
   detecting a plurality of zero-cross samples each having a different plus-minus sign from a sign of an adjacent sample from among a plurality of samples obtained by oversampling a received signal;
   changing positions of the detected zero-cross samples to positions inside a window referring to a position of a reference zero-cross sample selected from the detected zero-cross samples;
   calculating an average value of relative distances between the reference zero-cross sample and the zero-cross samples, after the positions of the zero-cross samples are changed at the changing; and
   determining a zero-cross point serving as a reference point for estimating a peak position of the received signal, based on the calculated average value of the relative distances and the reference zero-cross sample, wherein
   the changing includes setting the window having a position of the reference zero-cross sample as a center and having a width smaller than number of samples corresponding to a symbol by 1.

2. The communication device according to claim 1, wherein the changing includes moving a zero-cross sample positioned outside a width in a plus direction of the window from the reference zero-cross sample toward a minus direction in units of a symbol length.

3. The communication device according to claim 1, wherein the changing includes moving a zero-cross sample positioned outside a width in a minus direction of the window from the reference zero-cross sample toward a plus direction in units of a symbol length.

4. The communication device according to claim 1, wherein the process further includes:
   selecting a sample positioned at a peak position being present a half symbol length ahead of the zero-cross point determined at the determining; and
   reproducing data binarized according to a sign or an amplitude value of the sample selected at the selecting.

5. A method for reproducing data, the method comprising:
   detecting a plurality of zero-cross samples each having a different plus-minus sign from a sign of an adjacent sample from among a plurality of samples obtained by oversampling a received signal;
   changing positions of the detected zero cross samples to positions inside a window referring to a position of a reference zero-cross sample selected from the detected zero-cross samples;
   calculating an average value of relative distances between the reference zero-cross sample and the zero-cross samples, after the positions of the zero-cross samples are changed at the changing; and
   determining a zero-cross point serving as a reference point for estimating a peak position of the received signal, based on the calculated average value of the relative distances and the reference zero-cross sample, wherein
   the changing includes setting the window having a position of the reference zero-cross sample as a center and having a width smaller than number of samples corresponding to a symbol by 1.

6. A non-transitory computer-readable recording medium having stored therein a data reproduction program that causes a computer to execute a process comprising:
   detecting a plurality of zero-cross samples each having a different plus-minus sign from a sign of an adjacent sample from among a plurality of samples obtained by oversampling a received signal;
   changing positions of the detected zero cross samples to positions inside a window referring to a position of a reference zero-cross sample selected from the detected zero-cross samples;
   calculating an average value of relative distances between the reference zero-cross sample and the zero-cross samples, after the positions of the zero-cross samples are changed at the changing ; and
   determining a zero-cross point serving as a reference point for estimating a peak position of the received signal, based on the calculated average value of the relative distances and the reference zero-cross sample, wherein
   the changing includes setting the window having a position of the reference zero-cross sample as a center and having a width smaller than number of samples corresponding to a symbol by 1.

* * * * *